United States Patent [19]

Hattori et al.

[11] 4,420,835
[45] Dec. 13, 1983

[54] HOLLOW CATHODE LASER

[75] Inventors: Shuzo Hattori, Nagoya; Noboru Kamide, Tokyo; Katsumi Tokudome, Hidakamachi; Michio Ishikawa; Yuji Hayashi, both of Kawagoe, all of Japan

[73] Assignee: Kimmon Electric Co., Ltd., Tokyo, Japan

[21] Appl. No.: 268,063

[22] Filed: May 28, 1981

[51] Int. Cl.³ .............................................. H01S 3/097
[52] U.S. Cl. ...................................... 372/88; 372/85; 372/61
[58] Field of Search ....................... 372/87, 88, 85, 61, 372/62, 74

[56] References Cited

U.S. PATENT DOCUMENTS 4,257,014  3/1981  Hattori et al. .......................... 372/61

OTHER PUBLICATIONS

Csillag et al., "Output Characteristics of a Hollow Cathode He-Cd Laser" Optics Communications, vol. 21, No. 1, (Apr. 1977) pp. 39–41.
Rozsa et al., "Noble Gas Mixture CW Hollow Cathode Laser with Internal Anode System," Optics Comm., vol. 23, No. 1 (Oct. 1977) pp. 15–18.

Primary Examiner—William L. Sikes
Assistant Examiner—Leon Scott, Jr.
Attorney, Agent, or Firm—Frishauf, Holtz, Goodman and Woodward

[57] ABSTRACT

A hollow cathode laser comprises a cathode body which constitutes a part of a discharge envelope. The cathode body has a cathode hole coaxial with the body. It further has three anode holes which are through holes extending parallel to the axis of the cathode body and communicating with the cathode hole through slits, respectively. Three cylindrical anodes extend respectively through the anode holes and are spaced by a given distance from the inner surfaces defining the respective anode holes. The anodes have portions which protrude through the respective slits and which are positioned flush with the inner surface defining the cathode hole in the circumferential direction thereof.

9 Claims, 3 Drawing Figures

HOLLOW CATHODE LASER

BACKGROUND OF THE INVENTION

This invention relates to a laser, and more particularly to a hollow cathode type laser.

In a "coaxial hollow cathode" type discharge device, an anode is disposed outside the cathode cylinder and electrons flow through slots cut in the cathode cylinder toward the anode, as described by W. K. Schuebel in IEEE Journal of Quantum Electronics, Vol. QE-6, pp. 574-575, 1969. This type of hollow cathode discharge device is most popular because it advantageously provides a uniform negative glow discharge in the laser active medium along the axis of the cathode cylinder. However, it has drawbacks of its own. First, it exhibits constant voltage-current characteristics. Secondly, it sometimes provides an unstable discharge which will possibly result in arc discharge. Thirdly, its cathode cylinder is heated too much because no effective measures are taken to cool the cylinder. Overheating of the cylinder shortens the life of the laser and indirectly makes it difficult to achieve an adequate distribution of metal vapor pressure inside the cathode cylinder.

Another discharge device called "multiple anode hollow cathode discharge device" is known, as disclosed by J. A. Piper and C. E. Webb in Journal of Physics D: Applied Physics, Vol. 6, pp. 400-407, 1973. This device uses many pin-shaped anodes, and electrons produced by negative glow discharge flow through holes made in the cathode cylinder toward the pin-shaped anodes. Indeed the device effects a stable discharge and its cathode cylinder can be easily cooled. But the discharge is not sufficiently homogeneous along the axis of the cathode cylinder.

Still another discharge device called "hollow anode cathode discharge device" is known, as proposed by K. Rosza, M. Janossy and L. Csillaq in Physics Letters, Vol. 63A, pp. 231-232, 1977. This device achieves an extremely stable discharge which is very homogeneous along the axis of the cathode cylinder. Further, the cathode cylinder, which is the outermost member, can easily be cooled. This device is disadvantageous, nonetheless. It exhibits somewhat linear voltage-current characteristics; a rapid voltage rise is inevitable with an increase of current. This means that the temperature of electrons rises as more and more current is applied. The device cannot therefore be suitable for use in lasers whose upper level is low, such as He-Cd lasers or He-Zn lasers. It may be used only in rare gas ion lasers. The device is disadvantageous also in that it is rather difficult to accomplish a negative glow discharge of a small radius within the anode arranged coaxially with the cathode cylinder.

SUMMARY OF THE INVENTION

An object of this invention is to provide a hollow cathode laster whose cathode cylinder can be easily cooled and which can achieve a homogeneous discharge along the axis of the cathode cylinder.

Another object of the invention is to provide a hollow cathode laser whose voltage-current characteristic is substantially linear and which can achieve a discharge more stable than that of the coaxial hollow cathode laser.

According to this invention there is provided a hollow cathode laser which comprises a pair of mirrors constituting an optical cavity; at least one metal cylinder extending coaxially with the optical cavity and having a through hole extending coaxially with the optical cavity, a plurality of anode holes extending parallel to the axis of the optical cavity and arranged symmetrical with respect to the through hole and a plurality of slits through which the anode holes communicate with the through hole; a plurality of anodes extending respectively through the anode holes, spaced by a predetermined distance from the inner surfaces defining the respective anode holes and each having a portion protruding toward the through hole through the slit; and means for sealing electrically discharged gas capable of emitting coherent radiation within the through hole and the anode holes in air-tight fashion.

DETAILED DESCRIPTION OF THE PREFERRED EMBODIMENT

Figure 1:
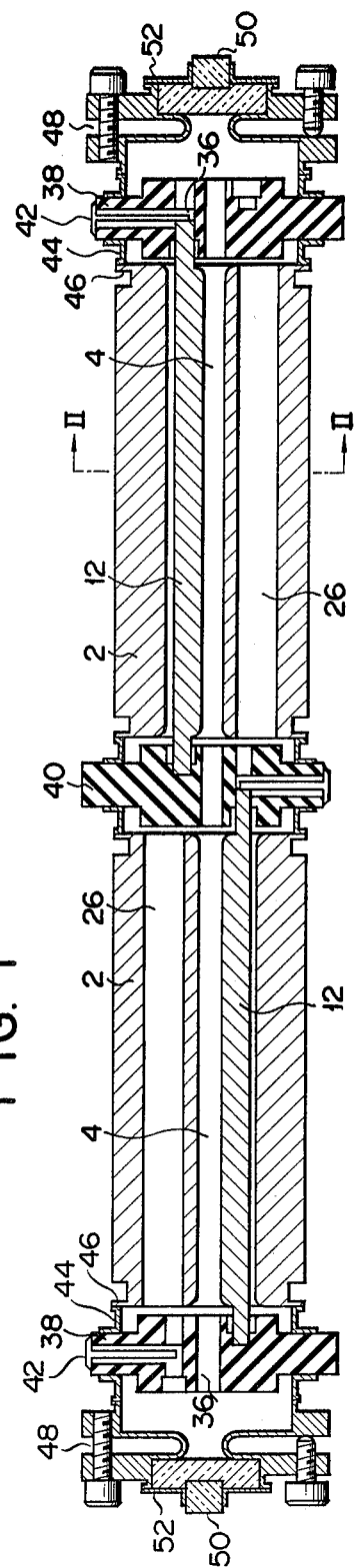
FIG. 1 is a longitudinal cross-sectional view of a hollow cathode laser according to this invention.

Now referring to FIGS. 1 and 2, a hollow cathode laser of this invention will be described. The laser comprises a cylindrical cathode body 2 having a cathode hole 4 which is a through hole coaxial with the body 2. On the inner surface defining the hole 4 cadmium is deposited. Further, the cathode body 2 has three anode holes 6, 8 and 10 which are through holes extending parallel to the axis of the body 2. Still further, the cathode body 2 has three slits which connect the anode holes 6, 8 and 10 to the cathode hole 4.

The laser further comprises three anodes 12, 14 and 16 which are substantially rod-shaped. The anodes 12, 14 and 16 extend through the anode holes 6, 8 and 10, respectively. They are spaced for a distance from the inner surfaces defining the respective anode holes 6, 8 and 10. This distance is shorter than the cathode dark space (narrowest gap between the cathode and an anode in which discharge can take place) is thick. Otherwise, glow discharge could take place between each anode and the inner surface defining the anode hole. The anodes 12, 14 and 16 have portions 18, 20 and 22, respectively, each of which extends through the slit and is positioned flush with the inner surface of the cathode hole 4 in the circumferential direction thereof.

The cathode body 2 further has three through holes 24, 26 and 28 which extend parallel to the axis of the cathode body 2. These holes 24, 26 and 28 are used to provide a sufficient space for storing helium gas and therefore do not affect the manner in which to achieve discharge.

Figure 2:
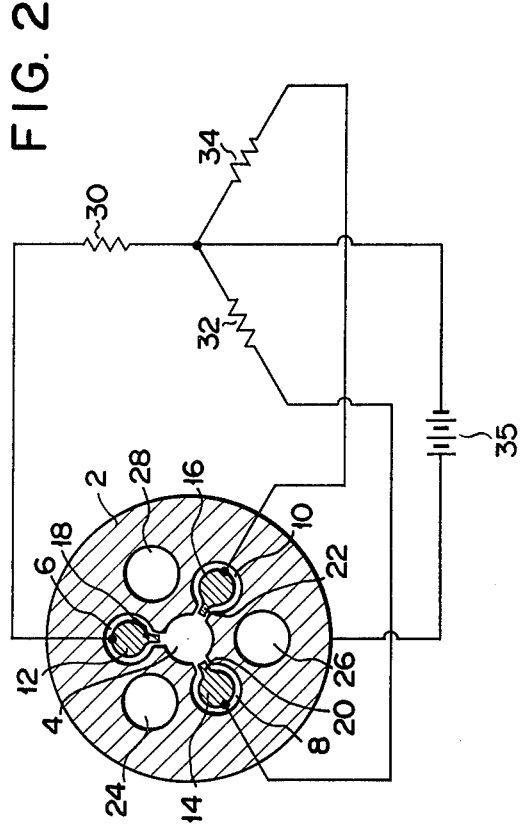
FIG. 2 is a cross-sectional view of the laser, taken along line II—II in FIG. 1.

When the anodes 12, 14 and 16 are connected to the negative terminal of a discharge voltage source 35 respectively through resistors 30, 32 and 34 as shown in FIG. 2 and when the cathode hole 4 is filled up with helium gas and cadmium gas, a negative glow discharge is generated which is homogeneous along the axis of the cathode body 2, which is substantially symmetrical with respect to the axis of the cathode body 2, and which is maintained stable in the cathode hole 4.

When current large enough to actuate the He-Cd laser is made to flow through the anodes 12, 14 and 16 while maintaining the surface temperature of the cathode body 2 at a temperature higher than the optimum value for the He-Cd laser, the anodes 12, 14 and 16 are heated to a temperature about 50° C. higher than said optimum value. As a result, the inner surface defining the cathode hole 4 is colder than any other parts of the discharge envelope and is maintained at the optimum temperature for the He-Cd laser. The temperature distribution is thus uniform in the radial direction of the cathode body 2 and helps to accomplish a stable discharge and a homogeneous metal vapor distribution.

As shown in FIG. 1, the anodes 12, 14 and 16 (only the anode 12 is shown) have their both end portions inserted in the holes 36 of two ceramic seal rings 38 and 40, respectively and thus secured to the rings 38 and 40. More specifically, one end portion of the anode 12, for example, is inserted in the hole 36 of the ring 38 and secured to the ring 38 by a pin 42 which is sealed in the ring 38 in air-tight fashion. A sealing fin 44 is attached to one side of the ring 38 and is welded to a flange 46 of the cathode body 2, thus securing the ring 38 to the cathode body 2. To the other side of the ring 38 there is secured an adjustable mirror mount 48. Welded to the mount 48 is a metal base 52. To this base 52 a mirror 50 is bonded, using glass flit.

As shown in FIG. 1, the laser further comprises another cathode body 2 identical with the above-described body 2, another set of anodes identical with the anodes 12, 14 and 16, and another seal ring identical with the seal ring 38. Thus, two identical assemblies are provided, each comprising a cathode body 2, three anodes 12, 14 and 16 and a seal ring 38. These assemblies are connected to each other by a seal ring 40, thus forming a discharge envelope.

Figure 3:
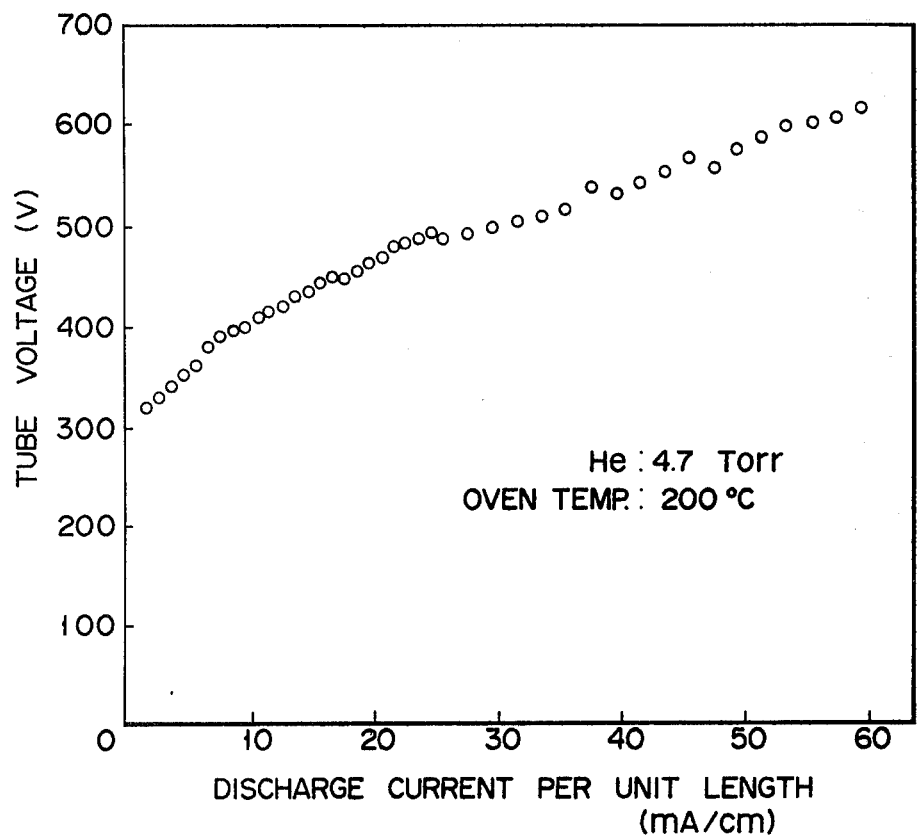
FIG. 3 illustrates the voltage-current characteristic of the hollow cathode laser shown in FIGS. 1 and 2.

FIG. 3 illustrates the voltage-current characteristic of the laser shown in FIGS. 1 and 2. The curve in FIG. 3 was obtained by plotting the relationship between the voltage applied on the cathode bodies 2 and the current flowing through every portion 1 cm long of the discharge envelope, which were recorded when the anode holes 6, 8 and 10 had a diameter of 1 cm, the surface temperature of the cathode bodies 2 was 200° C. and the helium gas pressure was 4.7 Torr. An initial voltage of 300 V was applied on the cathode bodies 2. As the discharge current density increases, the voltage rose slowly and gradually. This reveals that the discharge characteristic was of positive impedance type. The laser exhibiting such a voltage-current characteristic successfully provided a stable discharge, which was presumably attributable to a high potential gradient at the portions 18, 20 and 22 of the anodes 12, 14 and 16.

According to this invention, as mentioned above, it is possible to generate a glow discharge which is uniform along the axis of the cathode cylinder and which is symmetrical with respect to the axis thereof. In addition, the surfaces of the anodes used are maintained at a temperature lower than the temperatures of any parts. The discharge is thus sufficiently stable.

The invention can be applied to a laser using a glass envelope or an envelope having Brewster windows, as well as such a metal-ceramic envelope as described above.

What we claim is:

1. A hollow cathode laser system comprising:
   an elongated hollow cathode body (2) having a cathode hole (4) extending coaxially within said cathode body (2); a plurality of anode holes (6, 8, 10) formed in said cathode body (2) around said cathode hole (4) and extending in the same direction as said cathode hole (4); and a plurality of elongated slits extending along said anode holes (6, 8, 10) through which said anode holes (6, 8, 10) communicate with said cathode hole (4); said cathode hole (4) and anode holes (6, 8, 10) being filled with discharge gas for producing a laser active medium, said discharge gas being capable of emitting coherent radiation;
   a plurality of elongated anodes (12, 14, 16) extending through said anode holes (6, 8, 10), respectively, each anode having an elongated producing portion (18, 20, 22) protruding in said slit of the respective anode hole, and each anode having an outer surface spaced by a predetermined distance from the inner surface of said cathode body (2) defining the respective anode hole (6, 8, 10) so that the outer surface of each anode is substantially equidistant at substantially all points from the inner surface of its respective anode hole, even at their protruding portions;
   a voltage source (35) coupled to said anodes and to said cathode body for applying a voltage between said cathode body (2) and said anodes (12, 14, 16) to produce negative glow discharge in said cathode hole (4), thereby exciting said laser active medium;
   a pair of mirrors (50) forming an optical cavity in said cathode hole (4), for amplifying stimulated emissions from said laser active medium; and
   means (38, 40, 48, 52) coupled to said cathode body (3) for sealing said cathode hole (4) and said anode holes (6, 8, 10).

2. The hollow cathode laser system of claim 1, wherein said predetermined distance is smaller than the cathode dark space.

3. The hollow cathode laser system of claim 1, wherein said cathode body (2) comprises a plurality of further holes (24, 26, 28) which are used to store said discharge gas.

4. The hollow cathode laser system of claim 3, wherein said plurality of further holes (24, 26, 28) extend through said cathode body (2) in the same direction as said cathode hole (4), and are spaced from said cathode hole (4) in said cathode body (2).

5. The hollow cathode laser system of claim 4, wherein said plurality of further holes (24, 26, 28) communicate with said cathode hole (4) at end portions of said cathode body (2).

6. The hollow cathode laser of claim 1, comprising cadmium deposited on the inner surface defining said cathode hole.

7. The hollow cathode laser of claim 6, wherein said discharge gas is helium.

8. The hollow cathode laser of claim 1, wherein said discharge gas is helium.

9. The hollow cathode laser system of claim 1, further comprising a second elongated hollow cathode body having said cathode hole, said plurality of anode holes and associated slits and elongated anodes extending through said anode holes, said further elongated hollow cathode body being in axial alignment adjacent said first mentioned elongated hollow cathode body; said sealing means interconnecting said elongated hollow cathode bodies in axial alignment and sealing said cathode holes and anode holes thereof.

* * * * *